US011951503B2

(12) United States Patent
Drocco (10) Patent No.: US 11,951,503 B2
(45) Date of Patent: Apr. 9, 2024

(54) AUTOMATIC HUMIDIFICATION SYSTEM FOR A DISPENSING HEAD OF A DOSING MACHINE OF FLUID PRODUCTS

(71) Applicant: DROMONT S.p.A., Grinzane Cavour (IT)

(72) Inventor: Luca Drocco, Alba (IT)

(73) Assignee: DROMONT S.p.A.

( * ) Notice: Subject to any disclaimer, the term of this patent is extended or adjusted under 35 U.S.C. 154(b) by 698 days.

(21) Appl. No.: 17/109,689

(22) Filed: Dec. 2, 2020

(65) Prior Publication Data

US 2021/0162436 A1 Jun. 3, 2021

(30) Foreign Application Priority Data

Dec. 3, 2019 (IT) ........................ 102019000022872

(51) Int. Cl.
*B05B 7/04* (2006.01)
*B05B 7/16* (2006.01)
*B05B 7/22* (2006.01)
*F25B 21/02* (2006.01)
*G01F 11/00* (2006.01)

(52) U.S. Cl.
CPC .......... *B05B 7/0408* (2013.01); *B05B 7/1686* (2013.01); *B05B 7/22* (2013.01); *F25B 21/02* (2013.01); *G01F 11/006* (2013.01)

(58) Field of Classification Search
CPC ....... B05B 7/0408; B05B 7/1686; B05B 7/22; F25B 21/02; G01F 11/006
USPC .......................................................... 62/3.4
See application file for complete search history.

(56) References Cited

U.S. PATENT DOCUMENTS

| 4,387,002 A | 6/1983 | Knecht |
| 5,842,641 A | 12/1998 | Mazzalveri |
| 2007/0195122 A1 | 8/2007 | Hiruma et al. |
| 2019/0105666 A1 | 4/2019 | Duss et al. |

FOREIGN PATENT DOCUMENTS

| EP | 1510260 A1 | 3/2005 | |
| EP | 2745943 A1 * | 6/2014 | .......... B01F 13/1055 |
| EP | 2745943 B1 | 11/2017 | |
| WO | 2005107956 A1 | 11/2005 | |
| WO | 2018185678 A1 | 10/2018 | |
| WO | WO-2018185678 A1 * | 10/2018 | |
| WO | 2019145988 A1 | 8/2019 | |

OTHER PUBLICATIONS

European Search Report dated Sep. 1, 2020. 9 pages.

* cited by examiner

*Primary Examiner* — Steve S Tanenbaum
(74) *Attorney, Agent, or Firm* — RMCK Law Group PLC (57) ABSTRACT

A humidification system of a dispensing head of a dosing machine of fluid products, where the dispensing head includes a closing device having a cup, which can be moved between a distal inoperative position and an operative position where the dispensing head is isolated from the environment. The humidification system automatically generates a humid environment inside the cup, in the proximal position of the closing element, by means of a Peltier cell inserted in a forced flow duct of ambient air. The condensed and/or frosted water from the Peltier cell is fed from a collecting tank to the cup of the closing element automatically through a control unit.

6 Claims, 7 Drawing Sheets

AUTOMATIC HUMIDIFICATION SYSTEM FOR A DISPENSING HEAD OF A DOSING MACHINE OF FLUID PRODUCTS

CROSS-REFERENCE TO RELATED APPLICATION

This application claims priority to Italian Patent Application No. 102019000022872 filed Dec. 3, 2019. The disclosure of the above application is incorporated herein by reference in its entirety.

FIELD OF THE INVENTION

The present invention relates, in general, to dosing machines for dispensing products such as dyes for paints or the like.

More precisely, the invention relates to the dispensing head of such a dosing machine and has been developed, in particular, in view of the application to dispensing of dyes for preparing paints. In the following description, reference will be made to this specific application field without, however, losing generality.

STATE OF THE ART

A dosing machine for dispensing dyes for preparing paints generally comprises a plurality of containers containing respective dyes which, in the case of so-called "simultaneous machines", are connected to a single dispensing head by means of respective ducts. A plurality of metering pumps feed metered quantities of dyes from the containers to the dispensing head, which usually comprises a plurality of nozzles with vertical axis parallel to each other, open at the lower ends and enclosed in a tubular member having an open lower edge.

Dispensing of the dyes from the nozzles of the dispensing head is typically discontinuous. At the end of the dispensing, elongated drops of dyes are formed, which protrude from the lower ends of the nozzles of the dispensing head: for correct operation of the dosing machine, it is necessary that these drops of dye remain in a fluid state and do not harden.

To avoid or limit the risk of hardening of the drops of dye at the lower ends of the nozzles of the dispensing head, the dosing machines may be equipped with a closing device that closes the lower end of the dispensing head at the end of the dispensing of dyes. In this way, the area around the lower ends of the nozzles of the dispensing head is isolated from the external environment, and the drying of the drops of dye due to exposure to air is reduced. The quality of the insulation can be improved by means of a seal in the contact between the closing element and the lower end of the tubular member of the dispensing head, as well as with the aid of a sponge soaked in liquid arranged inside the closing element. This allows maintenance of a humid environment in the area of the dispensing head when the closing element is applied thereto, so as to further hinder the drying of the drops of dye.

A solution of this type is described and illustrated in the Italian patent application no. 102019000007192 by the same Applicant, not published at the date of filing/priority of this application, according to which the closing element can be moved with respect to the dispensing head according to a combined roto-translation movement.

To reduce the risk of drying of the drops it has also been proposed, in the European patent EP2745943B1, to provide a cooling system for the nozzles of the dispensing head in order to maintain a dew point state of the liquid present inside the nozzles, so as to keep them in a humid state, thus avoiding drying. According to this solution, a cooling element is provided, which is in cooling contact with at least one end part of the dispensing head.

This solution, as it is applied directly to the dispensing head, is relatively complicated and its functional effectiveness does not appear to be entirely satisfactory.

OBJECT AND SUMMARY OF THE INVENTION

The object of the present invention is to make a humidification system available for a dispensing head of a dosing machine for fluid products, particularly (though not exclusively) a tinting machine, which allows auto-humidifying the nozzles of the head, drastically reducing the possibility of drying of the metered product, without the need to be directly applied to the dispensing head.

Another object of the invention is to provide a humidification system that is relatively simple, functional and such as to be able to operate automatically in a reliable and safe manner.

According to the present invention, this object is achieved by means of a humidification system having the characteristics defined in claim 1.

The claims form an integral part of the disclosure provided here in relation to the invention.

One of the characteristic aspects of the humidification system according to the present invention is that it is operatively associated with the cup of the closing element, which is movable between an inoperative distal position with respect to the dispensing head, and a proximal operative position wherein the dispensing head is hermetically sealed and isolated from the surrounding environment. The humidification system according to the invention is designed to automatically generate a humid environment inside the cup of the closing element when it is in the proximal position, and advantageously includes a cooling device consisting of a Peltier cell and a supply circuit of the condensed water from the Peltier cell into the cup of the closing element. Activation and deactivation of the supply circuit are controlled automatically according to the temperature and humidity of the ambient air, as well as the level of the water inside a condensate collecting tank from the Peltier cell and that contained inside the cup of the closing element.

BRIEF DESCRIPTION OF THE DRAWINGS

Additional characteristics and advantages of the present invention will become apparent from the detailed description that follows, given purely by way of non-limiting example, with reference to the attached drawings, wherein.

DETAILED DESCRIPTION

Figure 1:
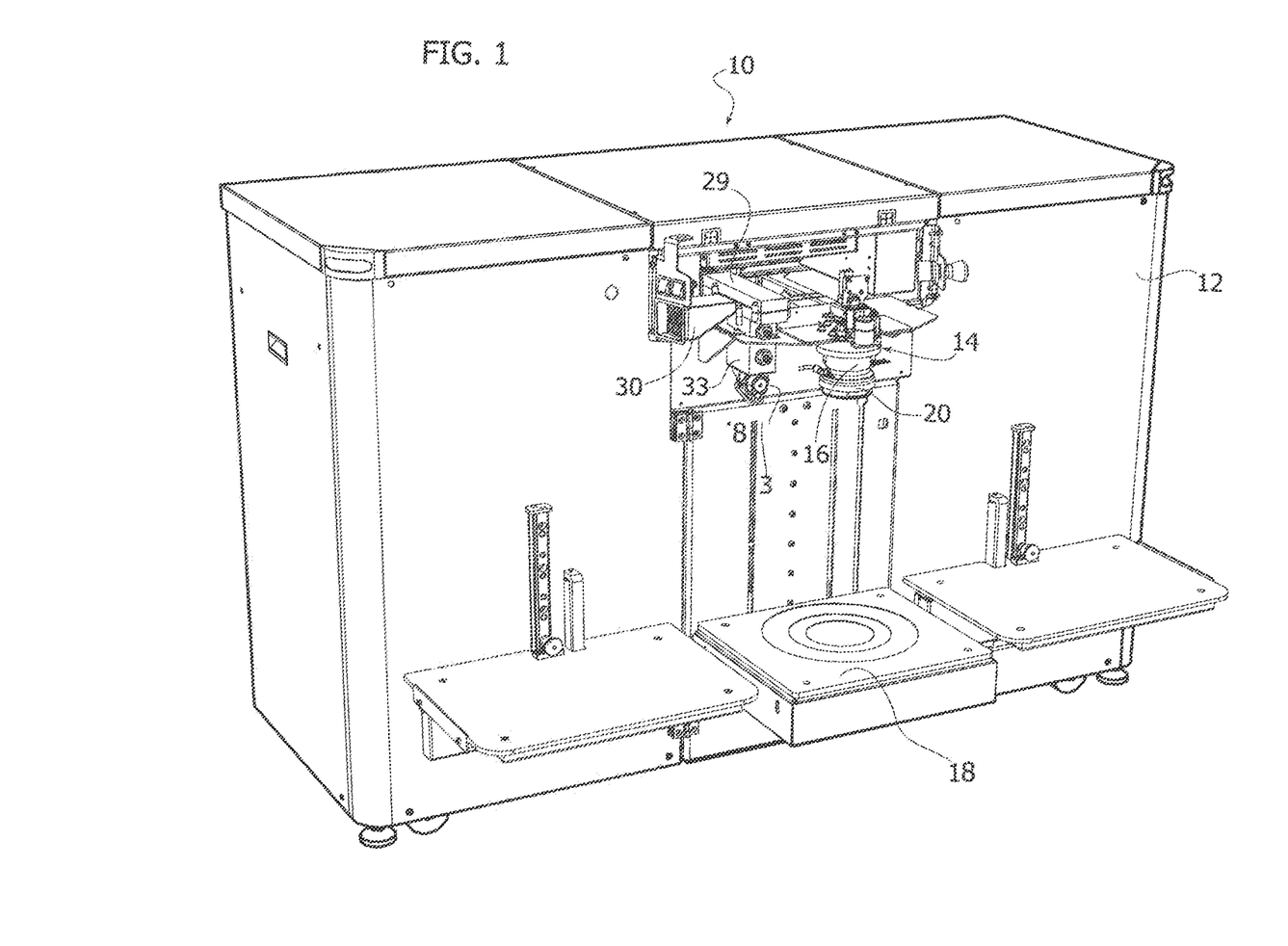
FIG. 1 is a schematic perspective view of a dosing machine provided with a humidification system according to the present invention.
Figure 2:
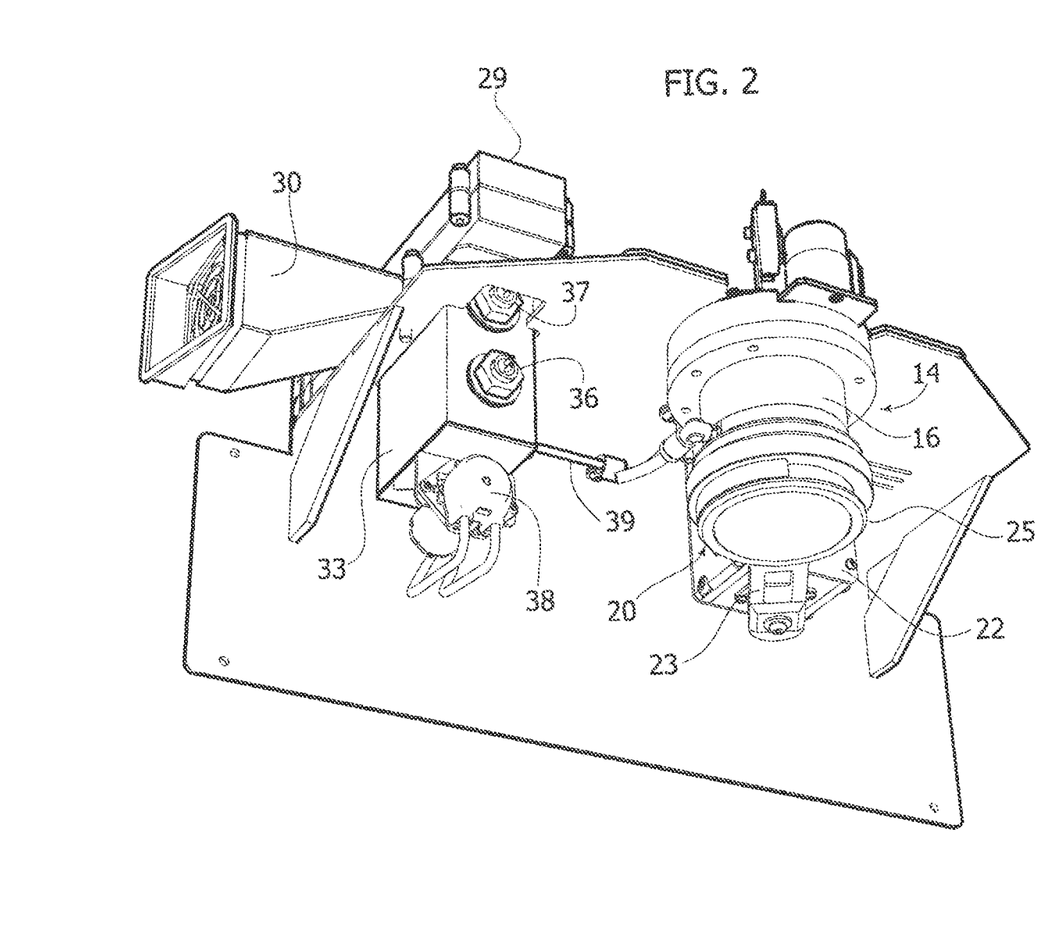
FIG. 2 is a perspective view from below and on a larger scale of the dispensing head of the dosing machine, with the humidification system.

With initial reference to FIG. 1, numeral 10 indicates—in its entirety—a dosing machine suitable for dispensing metered quantities of fluid products, for example, dyes for preparing paints. The machine 10 comprises—in a known way—a stock 12, which contains a plurality of containers ("canisters") for the different dyes connected to respective ducts by means of respective metering pumps—not illustrated.

Figure 3:
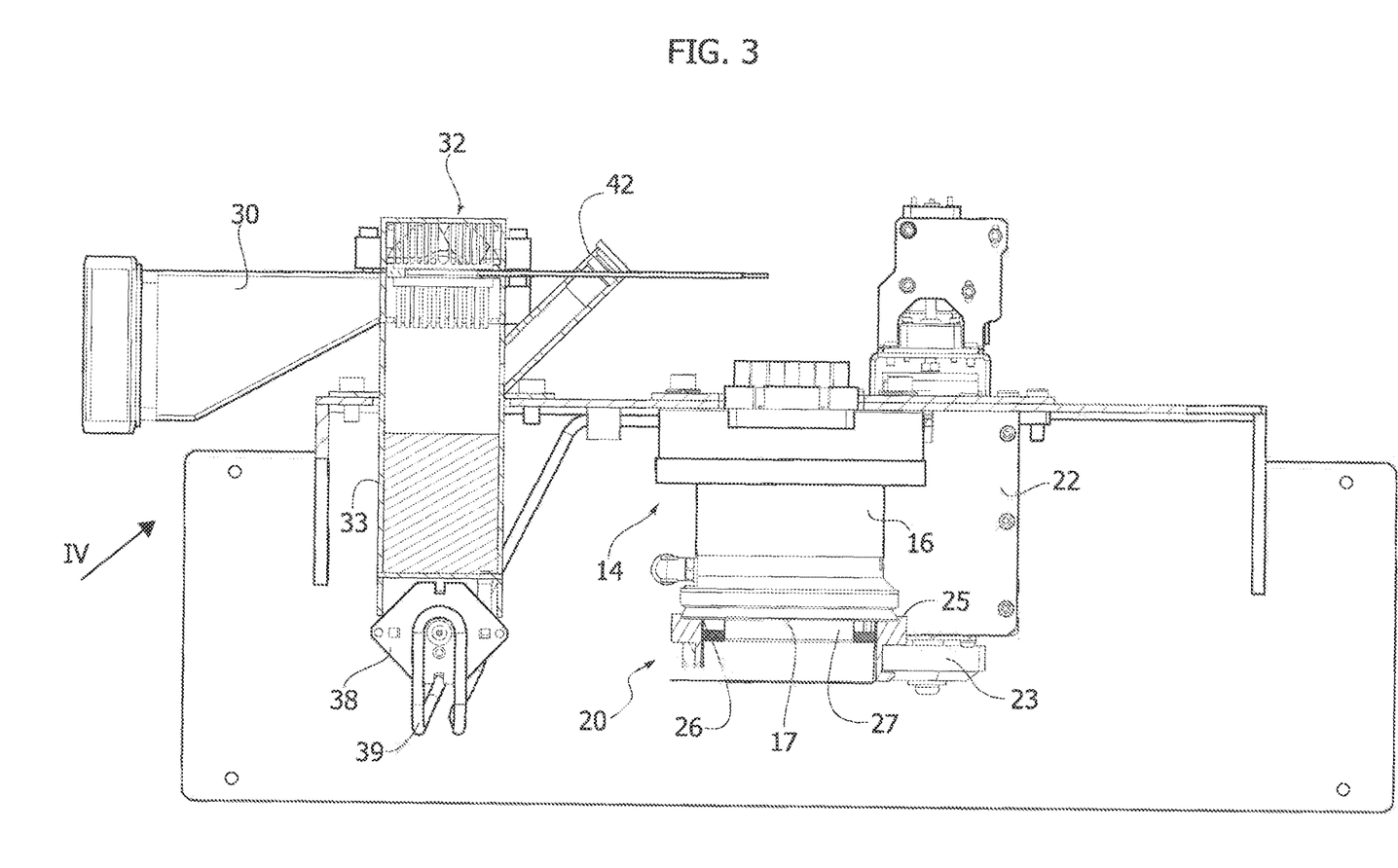
FIG. 3 is a front elevational view of FIG. 2, which is partially cross-sectioned.
Figure 4:
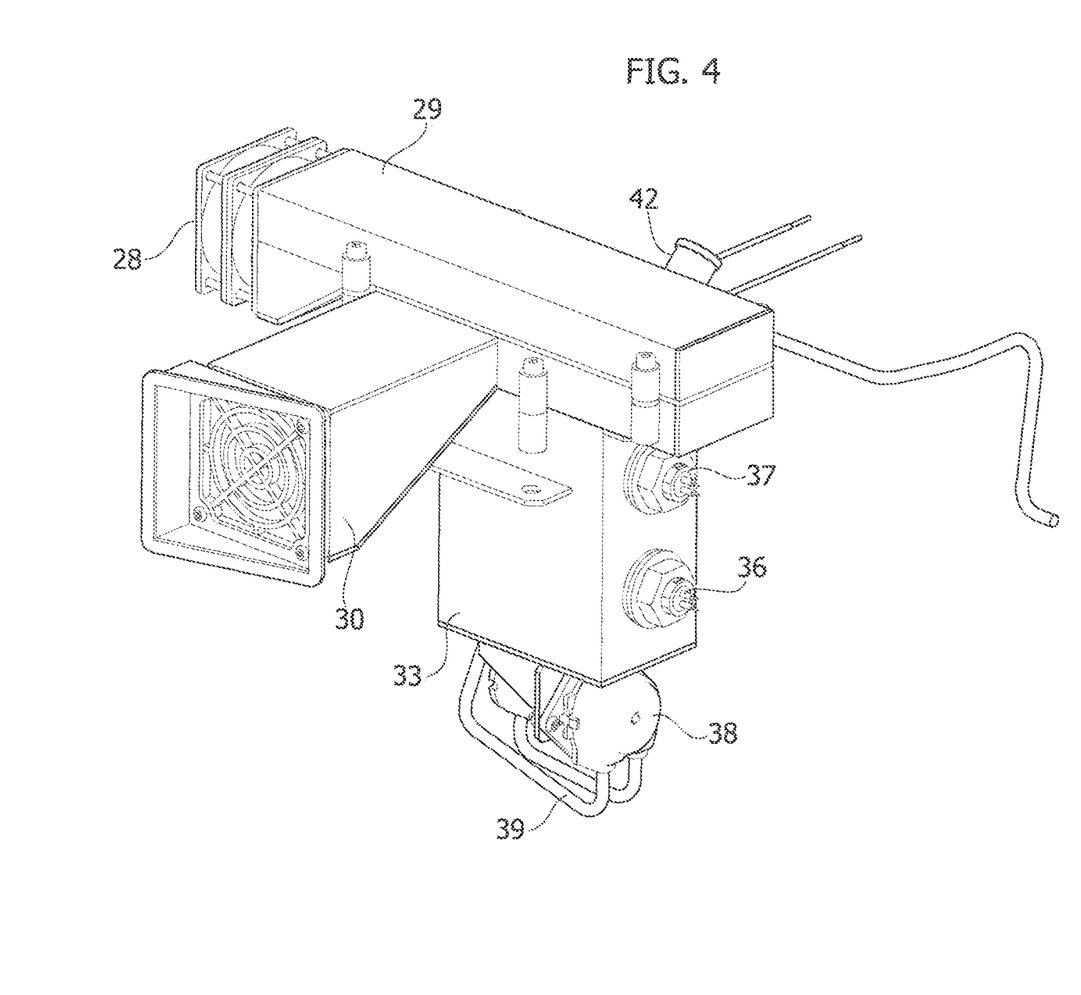
FIG. 4 is a partial perspective view according to the arrow IV of FIG. 3.
Figure 5:
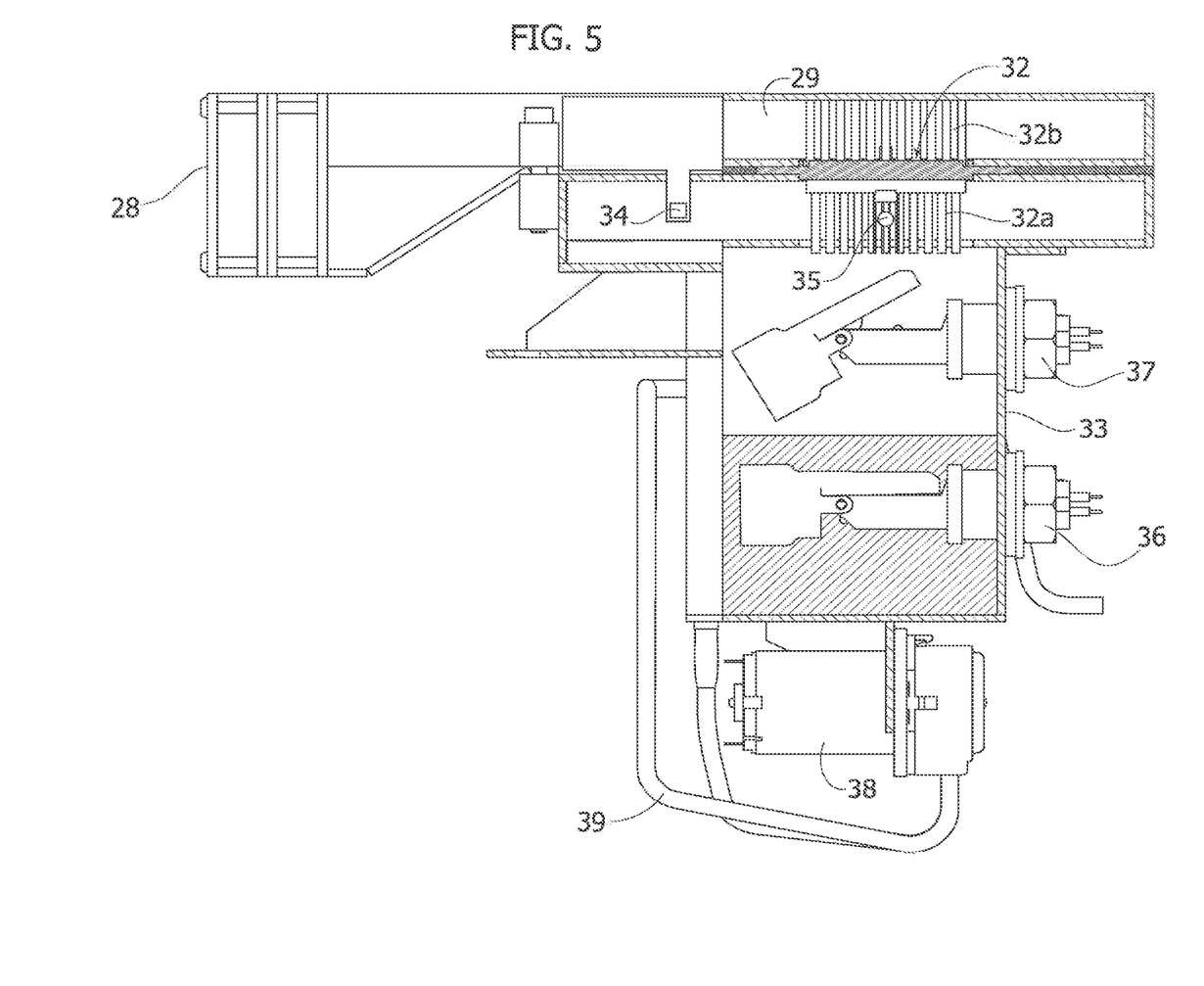
FIG. 5 is a front elevational view of FIG. 4, which is on a greater scale and partially cross-sectioned.
Figure 6:
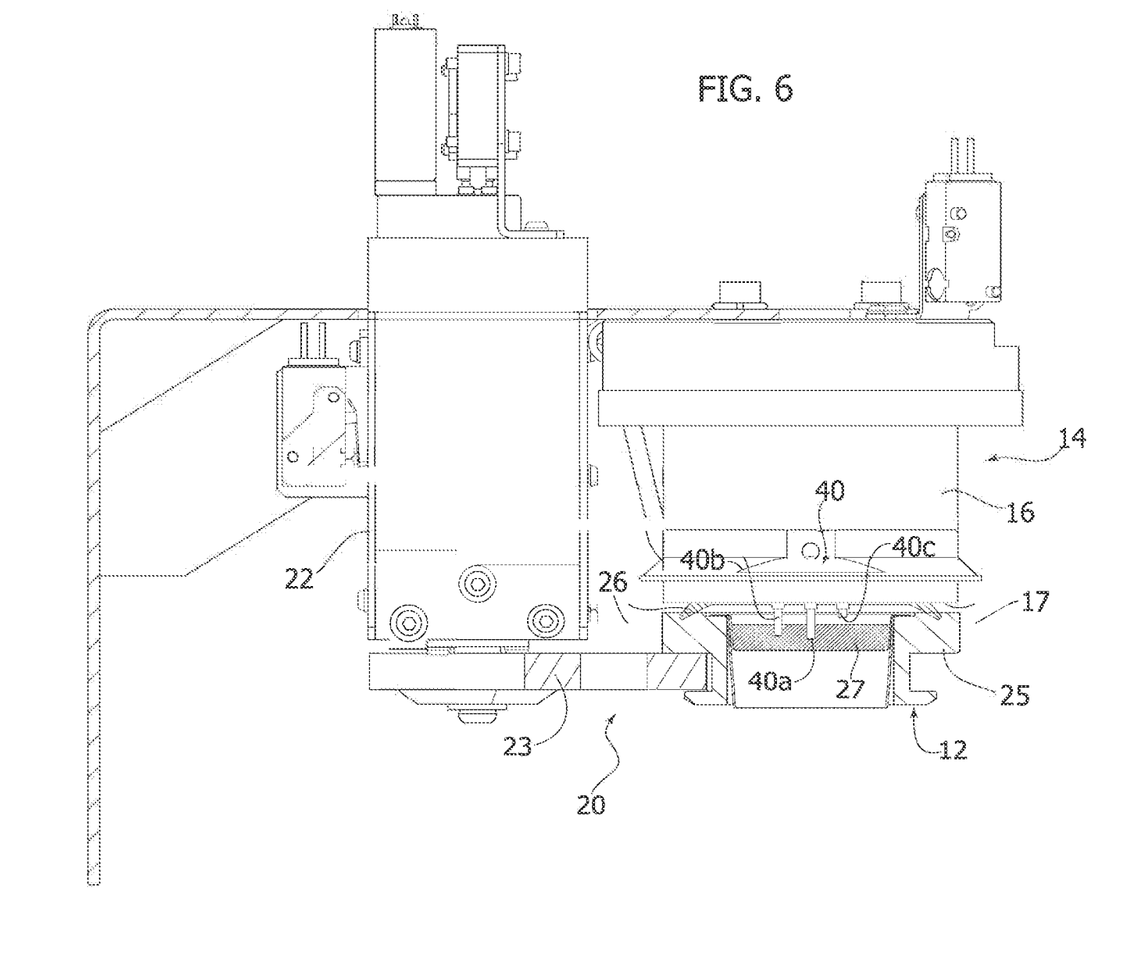
FIG. 6 is a dorsal elevational view of FIG. 3, which is on a greater scale and partially cross-sectioned.

The ducts coming from the various containers of the machine 10 are connected to a dispensing head 14 inside which a plurality of vertically-oriented nozzles are arranged in a known way, and connected to the metering pumps. The nozzles of the dispensing head 14 are enclosed within a tubular member 16 having an open lower edge 17 (FIGS. 3 and 6).

A base 18 is arranged below the dispensing head, on which containers are placed in which the dyes dispensed by the dispensing head 14 are poured each time.

A closing device 20 is operatively associated with the dispensing head 14, configured to isolate the lower ends of the nozzles of the dispensing head 14 from the external environment, at the end of each dye-dispensing step.

The closing device 20 is described and illustrated in the aforementioned Italian patent application no. 102019000007192 by the Applicant: briefly it comprises a stationary support 22 containing a motorized unit for moving a closing element 25 bearing a cup 27 upwardly open. The closing element 25 is carried by an arm 23, which can be moved angularly and vertically between an open distal position and a closed proximal position, represented in the drawings, relative to the dispensing head 14. This actuation assembly will not be described in detail here: for the purposes of the present invention it is sufficient to specify that it can perform the combined movement of vertical translation and rotation of the arm 23 and, therefore, of the closing element 25 with the cup 27. In this proximal closing position, the upper face of the closing element 25 is sealingly engaged, by means of an annular seal 26, against the lower edge 17 of the tubular member 16, with the cup 27 isolated from the external environment and arranged below the nozzles of the dispensing head 14.

According to the unique characteristic of the invention, the cup 27 defines a chamber configured for containing water generated by condensation at a temperature equal to or less than the dew point of ambient air. The humid environment thus generated inside the sealed volume delimited between the cup 27 and the tubular member 16 of the dispensing head 14 allows, when the dispensing head 14 is sealed by the closing device 20, increasing the protection of the dispensing head thanks to the further reduction of the possibility of drying the products that are stationed at the ends of the various nozzles when no dosages are in progress.

The humidification system according to the invention, which as will be seen is automatic even if it can be supplemented by a manual refilling when necessary, envisages the intake of ambient air by means of one or more electric fans 28 positioned at the end of a forced duct 29 in communication with a suction mouth 30.

Inside the forced duct 29 there is a cooling device consisting of a Peltier cell 32 and two heatsinks 32a, 32b arranged, respectively, on the cold side and on the hot side of the cell, of which at least the cold sink 32a is crossed by the airflow produced by the fan(s) 28. The hot sink 32b can be crossed in series by the same airflow that passes through the cold sink 32a, after the latter, in order to achieve a particular efficiency advantage due to the cooling effect of the airflow that hits the hot sink 32b, by previously crossing the cold sink 32a; alternatively, depending on the embodiment, the hot sink 32b may have its own independent ventilation. In any case, the heat dissipation created by the hot sink 32b has the object of allowing the effective operation of the cell 32 and, therefore, of obtaining the appropriate amount of cooling of the cold sink. The function of this cooling system is to create water by condensing or frosting the humidity from the ambient air drawn into the duct 29 onto the cold sink 32a of the Peltier cell 32. Frost instead of condensation may be due to the occurrence of an environmental condition such that the dew point is lower than the freezing point of the local atmospheric humidity, or it may be desired for functional reasons, even if the dew point is higher than said freezing point, in order to collect—per unit of time—a quantity of water from the atmosphere greater than that allowed by simple condensation; in the case of frost, the work cycle envisages a periodic shutdown step of the Peltier cell 32 and, therefore, the cessation of the cooling action of the cold sink 32a, which allows, also thanks to the continued forced ventilation of ambient air through the forced duct 29, liquefaction of the deposited frost. The collection of the water necessary for the humidification function takes place by making the water collected on the cold sink 32a drip by gravity into an underlying collecting tank 33; this tank 33 acts as a reserve of water, which is always available and the withdrawal of which can be activated/deactivated instantly at any time, regardless of the times associated with the start/stop transients of the condensation/frosting process.

In order for the condensation/frost on the cold sink 32a to take place, it is necessary that the sink itself is brought to and maintained at a temperature not exceeding the dew temperature (target temperature): the system can, therefore, provide a temperature and relative humidity sensor of the ambient atmosphere 34, positioned in the first part of the forced duct 29 and designed to be able to constantly calculate the dew point, and a local sensor 35 of the target temperature, represented by the temperature of the cold sink 32a of the Peltier cell 32, in order to close the control ring and automate the cooling process.

Inside the collecting tank 33 there are two level sensors 36, 37, which allow signaling the reaching of a minimum level and a maximum level of water, respectively, in order to also automate the activation/deactivation process of the condensation system (suction and cooling).

The water stored in the collecting tank 33 is withdrawn, if necessary, by a pump 38 to be sent inside the cup 27 of the closing element 25, in the steps in which this is in the proximal closing position of the dispensing head 14 of the dosing machine 10. The delivery duct 39 of the pump 38 feeds the water from the tank 33 to the cup 27 without affecting the temperature of the dispensing head 14, since the temperature of the water is substantially the ambient one, thanks to its more or less prolonged stay inside the collecting tank 33, and to the passage through the pump 38 and relative ducts, all exposed to the ambient temperature.

The cup 27 is also equipped with a level sensor system 40, necessary to complete the automation of the system, consisting of three electrodes 40a, 40b and 40c protruding downwards from the dispensing head 14: the electrodes 40b and 40c protrude for different lengths and the electrode 40a protrudes for a length not less than that of the electrode 40b, and configured so as to detect a maximum and a minimum level of the water present inside the cup 27. The maximum level electrode 40c has a shorter length, the minimum level electrode 40a is longer than the maximum level electrode 40c, and the common electrode 40b has a length equal to or less than the minimum level electrode 40a. When the closing element 25 is in the proximal closing position of the dispensing head 14, these three electrodes are protruded inside the cup 27, evidently at different depths, thus resulting immersed or emerged relative to the water present therein. The liquid acts as a conductor and consequently opens or closes an electric circuit (at very low voltage) between minimum 40a and common 40b and/or between maximum 40c and common 40b, depending on the level of the liquid present in the tank 27.

Figure 7:
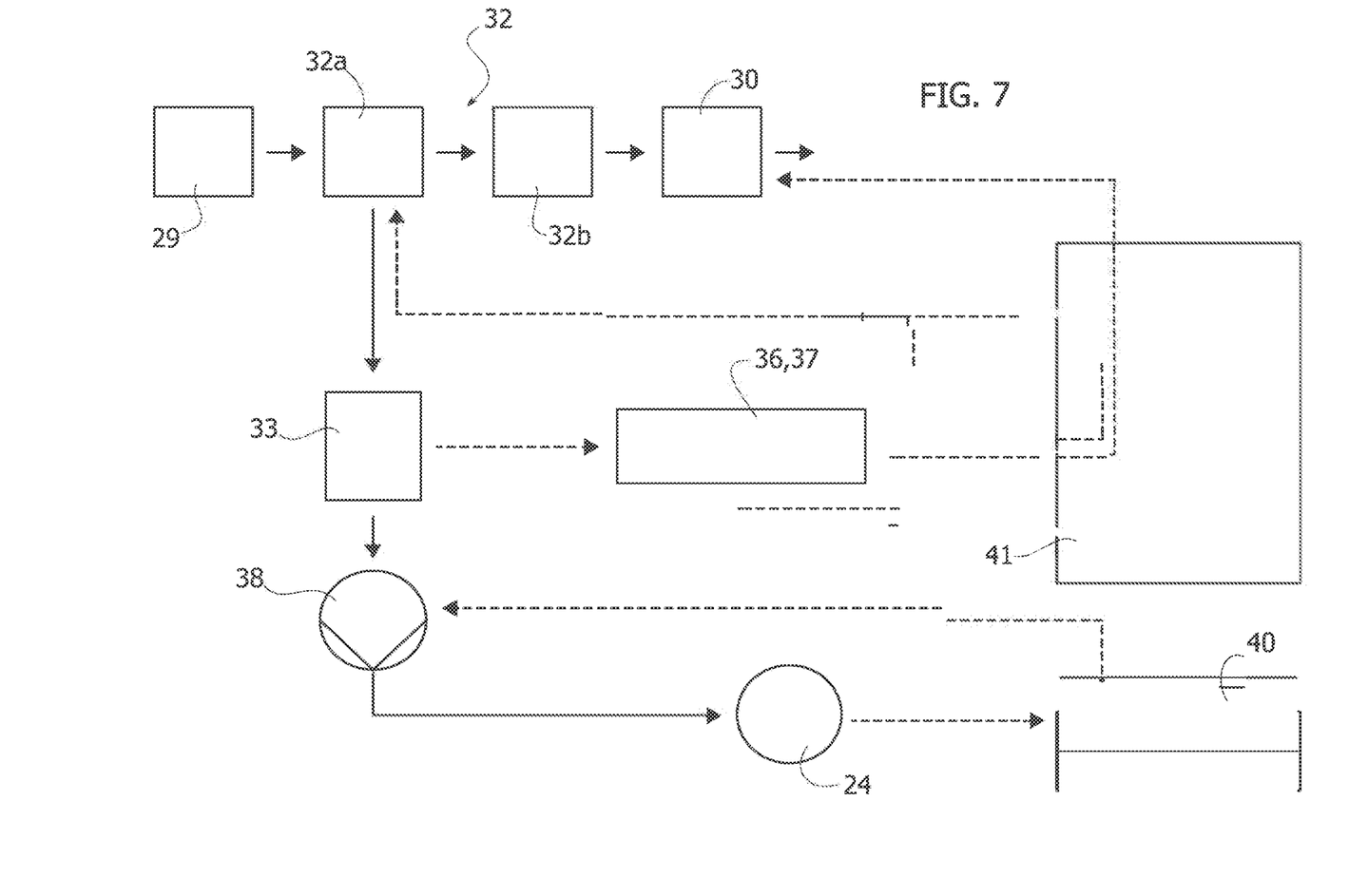
FIG. 7 is a block diagram that exemplifies the operation of the humidification system according to the invention.

The closed-loop control circuit of the cooling system according to the invention is represented in the block diagram of FIG. 7: an electronic control unit 41 activates (minimum detected level) or deactivates (maximum detected level) the pump 38 to send the liquid present in the tank 33 to the cup 27 of the closing element 24. Activating the airflow through the Peltier cell 32 by means of the electric fan(s) 28 is operated by the control unit 41, according to the signals coming from the level sensors 36, 37, when the water level inside the collecting tank 33 falls below a threshold value, as well as possibly (depending on whether for producing water the logic is chosen of cooling below the dew point, or of forced frosting at the minimum temperature that can be reached by the system at maximum power) according to the signals from the temperature and humidity sensors 34, 35. The control unit 41 activates the pump 38 when the water level inside said cup 27 detected by the sensors 40, in turn, drops below a threshold value.

In all the steps wherein no dosage is in progress and the closing element 25 of the dispensing head 14 is closed on the dispensing head itself, the humid environment thus created inside the cup 27 due to the progressive and spontaneous evaporation of the water present therein hinders the drying of the products to be dosed stagnant in the nozzles of the dispensing head 14, thus eliminating possible problems of obstruction of the ducts due to coagulation or solidification of the products themselves. The possible additional use of a non-illustrated heater, also integral with the dispensing head 14 and protruding inside the cup 27 until it is immersed below the water level when it is closed under the dispensing head 14, may improve the system by accelerating the evaporation of humidity and reducing the time required to reach a satisfactory humidity content in the atmosphere inside the cup 27 itself.

A manual refilling duct 42 (FIG. 3) can be provided to allow the introduction into the tank 33 of possible support additives such as disinfectants or anti-algae products, or possibly an extra manual refilling of water if required.

Finally, an optional version of the humidification system can be created, which does not include the water condensation device. This optional version with reduced automation may be proposed to meet two possible additional needs:
- to offer users the possibility of a cheaper version of the auto-humidification system, giving up the automatic production of water from the atmosphere,
- to allow the adoption of liquids other than water for auto-humidification in those cases of use of dosing machines where water would produce undesirable interactions with the products to be dosed if drops of the products fell into the cup 27 of the closing element 20.

In both these cases, the humidifying liquid can be manually inserted into the tank 33 through the refilling duct 42.

Of course, the details of construction and the embodiments can be widely varied with respect to those described and illustrated, without thereby departing from the scope of the present invention as defined by the claims that follow.

What is claimed is:

1. A humidification system for a dispensing head of a dosing machine of fluid products,
    wherein said dispensing head comprises:
        a closing device including a cup and a closing element having an upper open rim, said closing element being displaceable between an inoperative distal position with respect to said dispensing head and an operative proximal position wherein said upper open rim of the closing element sealingly engages a lower edge of the dispensing head,
    wherein said humidification system is designed to generate a humid environment inside said cup in said operative proximal position of the closing element, and includes:
        a cooling device comprising a Peltier cell arranged within a forced flow duct of environmental air,
        a collecting tank of water condensed and/or frosted by said Peltier cell,
        a water supply circuit from said collecting tank to said cup, and
        an automatic control unit of the cooling device and of the water supply circuit.

2. The humidification system according to claim 1, wherein said collecting tank is provided with a manual refilling duct.

3. The humidification system according to claim 1, wherein the cooling device comprises:
    a suction device of environmental air within said forced flow duct,
    temperature and humidity sensors of suctioned air,
    a temperature sensor associated with said Peltier cell, and water level sensors within said collecting tank;
    wherein level sensors of the water within said cup are provided, and a supply pump of the water in the water supply circuit from said collecting tank to said cup;
    said automatic control unit being operatively connected to said suction device, to said Peltier cell and to said sensors, and configured to activate said suction device when a water level within the collecting tank decreases below a threshold value, and to activate said supply pump when a water level within said cup decreases below a threshold value.

4. The humidification system according to claim 3, wherein said collecting tank is provided with a manual refilling duct.

5. The humidification system according to claim 3, wherein said water level sensors within the cup include a set of three electrodes comprising minimum, maximum and common electrodes, respectively, carried by the dispensing head and protruding at different levels into said cup.

6. The humidification system according to claim 5, wherein said collecting tank is provided with a manual refilling duct.

* * * * *

UNITED STATES PATENT AND TRADEMARK OFFICE
CERTIFICATE OF CORRECTION

| | |
|---|---|
| PATENT NO. | : 11,951,503 B2 |
| APPLICATION NO. | : 17/109689 |
| DATED | : April 9, 2024 |
| INVENTOR(S) | : Luca Drocco |

It is certified that error appears in the above-identified patent and that said Letters Patent is hereby corrected as shown below:

On the Title Page

(71) Applicant address information should be listed as:
- DROMONT S.p.A., Grinzane Cavour (Cuneo) ITALY -

(72) Inventor address information should be listed as:
- Luca DROCCO, Alba (Cuneo), ITALY -

Signed and Sealed this
Twenty-fifth Day of February, 2025

Coke Morgan Stewart
*Acting Director of the United States Patent and Trademark Office*